Figure 1:
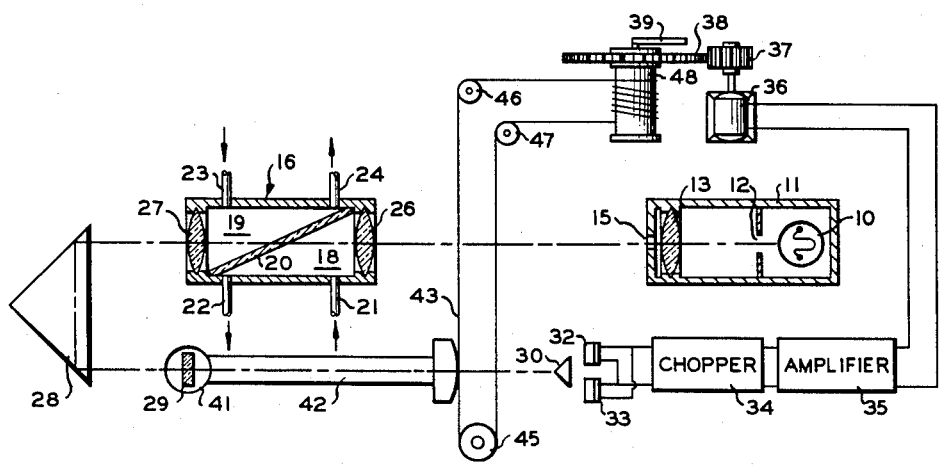

Dec. 16, 1958  M. S. SPARKS, JR  2,864,278

REFRACTOMETER

Filed March 7, 1955

INVENTOR.
M.S. SPARKS, JR.

BY *Hudson & Young*

ATTORNEYS

United States Patent Office 2,864,278
Patented Dec. 16, 1958

2,864,278

REFRACTOMETER

Marshall S. Sparks, Jr., Bartlesville, Okla., assignor to Phillips Petroleum Company, a corporation of Delaware Application March 7, 1955, Serial No. 492,647

1 Claim. (Cl. 88—14)

This invention relates to apparatus for comparing the amounts of radiation incident upon two photocells. In one specific aspect it relates to apparatus employing a pair of photovoltaic cells to measure the deviation of a beam of radiation passed through a refractometer cell assembly.

In various types of optical instruments it is necessary to compare two beams of radiation. In the visible and ultraviolet spectrum this comparison is commonly made by the use of photovoltaic cells. For example, in a differential refractometer a narrow beam of radiation is passed through a cell assembly which is arranged so that the radiation beam is deviated in accordance with the refractive index of a sample material positioned in the cell. The resulting beam is focused between a pair of adjacent photovoltaic cells so that equal quantities of radiation impinge upon the two cells when the refractive index of the sample is at a selected value. Any change in refractive index of the sample material results in a deflection of the light beam so that more light impinges upon one of the photocells than the other. A comparison of the output currents of the two photocells thus provides an indication of the refractive index of the sample material.

In another type of optical analyzer a first beam of radiation is directed through a first sample cell to a first photocell. A second beam of radiation is directed to a second photocell. A sample material is circulated through the sample cell. Any change in color of a material circulated through the sample cell changes the ratio of radiation incident upon the two photocells and provides a measurement of the color of the material.

In analyzers of these types, electrical measuring means must be provided to compare the output currents of the two photocells. Since the currents emitted by such cells are of small magnitude it usually is necessary to amplify the currents to provide a signal of sufficient magnitude to actuate indicating or control equipment. However, the direct current generated by a photovoltaic cell cannot readily be amplified.

In accordance with the present invention, a circuit is provided to measure the differential output of a pair of photovoltaic cells. The two cells are connected in opposition to one another so that the positive terminal of one is connected to the negative terminal of the other. The output terminals of the connected cells are connected to a synchronous chopper which provides an alternating current of amplitude proportional to the magnitude of the direct current applied thereto. The output terminals of the chopper are connected directly to the input terminals of a multistage electronic amplifier. The output signal of the amplifier is of sufficient magnitude to energize a control device, such as a servomotor.

Accordingly, it is an object of this invention to provide apparatus to compare two beams of radiation.

Another object is to provide improved apparatus for comparing the output signals of a pair of photovoltaic cells.

A further object is to provide apparatus to measure the refractive index of a test material by the deviation of a beam of light transmitted through a refractometer cell containing the test material.

A further object is to compare two current sources.

Figure 2:
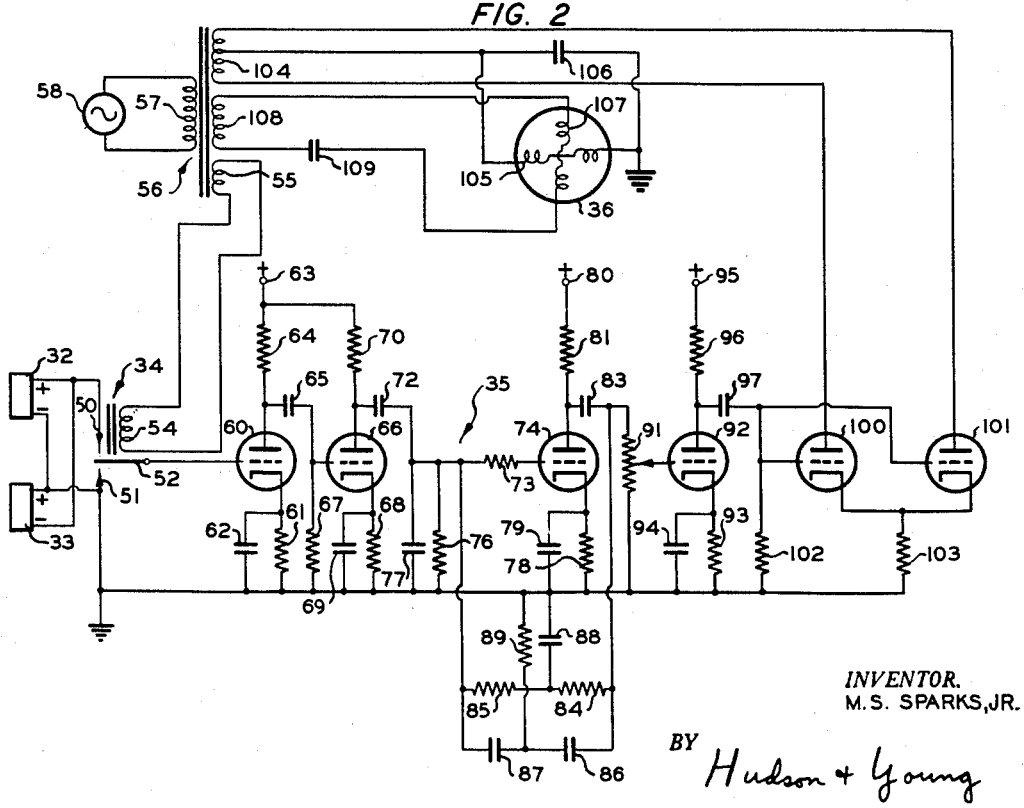

Other objects, advantages and features of this invention should become apparent from the following detailed description, taken in conjunction with the accompanying drawing, in which:

Figure 1 is a schematic representation of a differential refractometer having the measuring circuit of the present invention incorporated therein; and Figure 2 is a schematic circuit drawing of the measuring circuit of this invention.

Referring now to the drawing in detail, and to Figure 1 in particular, there is shown a differential refractometer which comprises a source of radiation 10 mounted in a housing 11. Source 10 can be an ordinary incandescent bulb emitting radiation in the visible spectrum. Radiation emitted from source 10 passes through a first aperture 12 and thence through a converging lens 13. A narrow beam of light emerges from housing 11 through a second aperture 15 and is directed through a refractometer cell assembly 16. The filament of source 1 is near the focal point of lens 13, but slightly therebeyond. Aperture 15 is positioned in close proximity to lens 13.

Cell assembly 16 includes a first chamber 18 and a second chamber 19 which are separated by a diagonal transverse plate 20 constructed of a material transparent to the radiation beam emitted from source 10. Chamber 18 is provided with an inlet conduit 21 and an outlet conduit 22. Chamber 19 is provided with an inlet conduit 23 and an outlet conduit 24. A reference material can be positioned in or circulated through chamber 18 and a test material can be circulated through chamber 19. A converging lens 26 defines one opening of chamber 18 and a second converging lens 27 defines the corresponding opening of chamber 19. The components thus far described are positioned so that aperture 15 is at the effective principal focus of lens 26. A narrow beam of radiation thus enters chamber 18 and emerges from chamber 19 through lens 27.

The radiation beam emerging from lens 27 enters a glass prism 28 which is positioned so that its front surface is substantially perpendicular to the beam of radiation. The radiation beam is twice reflected within prism 28 and emerges therefrom to pass through a rotatable block of glass 29 which has its two parallel surfaces substantially perpendicular to the path of radiation. From block 29 the radiation beam passes through a second prism 30 which is positioned so that the beam normally strikes the apex thereof in a line perpendicular to the base of the prism. A radiation detector assembly comprising first and second photovoltaic cells 32 and 33 is positioned so that a radiation beam striking the apex of prism 30 impinges equally on cells 32 and 33. The output terminals of cells 32 and 33 are connected in opposition to one another and to the input terminals of a synchronous chopper 34. The output terminals of chopper 34 are connected to the input terminals of alternating current amplifier 35. The output signal from amplifier 35 is connected to a reversible servomotor 36. The drive shaft of motor 36 is connected to a gear 37 which engages a second gear 38. Gear 38 is connected to a pointer 39 which indicates the position of motor 36.

Glass block 29 is mounted on a rotatable base 41 which has a pivot point near the center thereof. Base 41 is provided with an arm 42 which is attached to a cable 43. Cable 43 passes about suitable support posts 45, 46 and 47 and is wrapped about a shaft 48 which supports gear 38. Thus, rotation of gears 37 and 38 in response to a signal from amplifier 35 moves cable 33 to rotate glass block 29 about its midpoint. As described in detail hereinafter, this rotation is in a direction and is of sufficient magnitude to restore the light beam to the apex of prism 30 so that equal quantities of light impinge upon photocells 32 and 33. If the refractive indices of the materials in chambers 18 and 19 are equal, the light beam emerging from cell assembly 16 is in optical alignment with the light beam entering the cell assembly. The apparatus is positioned initially, for example, so that an undeviated light beam strikes the apex of prism 30 and is directed in equal intensities upon cells 32 and 33. If the refractive index of the test material should differ from the refractive index of the reference material, the beam of light emerging from cell assembly 16 is deviated in one direction or another so that more light impinges upon one of the photocells than upon the other. This creates an unbalance voltage which, after amplification, drives motor 36 to rotate glass block 29 to restore the balanced condition. The degree of rotation of motor 36, as indicated by pointer 39, thus provides a measurement of the refractive index of the test material in chamber 19. Obviously the rotation of motor 36 can be employed to control any selected process variable if the apparatus is employed in control operations.

The electrical measuring circuit of this invention is illustrated in detail in Figure 2. The first output terminal of cell 32 is connected to the second output terminal of cell 33 and to the first stationary contact 50 of synchronous chopper 34. The second output terminal of cell 32 is connected to the first output terminal of cell 33 and to the second stationary contact 51 of chopper 34. Contact 51 is also connected to ground. Chopper 34 preferably is of the form employing a vibrating element 52 which engages contacts 50 and 51 alternately at a preselected frequency. Movement of element 52 is provided by an electromagnetic element which is energized by a coil 54. The end terminals of coil 54 are connected to the respective end terminals of the secondary winding 55 of a transformer 56. The primary winding 57 of transformer 56 is energized by a source of alternating current 58, which can be a conventional 60 cycle, 115 volt power supply, for example.

Vibrating element 52 is connected directly to the control grid of a triode 60 which forms the first stage of amplifier 35. The cathode of triode 60 is connected to ground through a resistor 61 which is shunted by a capacitor 62. The anode of triode 60 is connected to a positive potential terminal 63 through a resistor 64. The anode of triode 60 is also connected through a capacitor 65 to the control grid of a second triode 66. The control grid of triode 66 is connected to ground through a resistor 67. The cathode of triode 66 is connected to ground through a resistor 68 which is shunted by a capacitor 69. The anode of triode 66 is connected to potential terminal 63 through a resistor 70. The anode of triode 66 is also connected through a capacitor 72 and a resistor 73 to the control grid of a triode 74. The junction between capacitor 72 and resistor 73 is connected to ground through a resistor 76. A capacitor 77 is connected in parallel with resistor 76. The cathode of triode 74 is connected to ground through a resistor 78 which is shunted by a capacitor 79. The anode of triode 74 is connected to a second positive potential terminal 80 through a resistor 81. The first terminal of a capacitor 83 is connected to the anode of triode 74.

A tuned feedback network is connected between the second terminal of capacitor 83 and the junction between capacitor 72 and resistor 73. This network comprises a pair of series-connected resistors 84 and 85 which are shunted by a pair of series-connected capacitors 86 and 87. The junction between resistors 84 and 85 is connected to ground through a capacitor 88, and the junction between capacitors 86 and 87 is connected to ground through a resistor 89. This feedback network thus constitutes a parallel-T filter which minimizes the transmission through the amplifier of stray voltages having frequencies other than 60 cycles. The filter is tuned to 60 cycles to present high impedance to such signals and relatively low impedance to signals of other frequencies. Accordingly, at frequencies other than 60 cycles the parallel-T filter provides some transmission and thus applies a degenerative feedback signal to the control grid of triode 74. Representative values of the circuit components which provide such transmission of 60 cycle signals are as follows: capacitors 86 and 87, 2500 micromicrofarads each; capacitor 88, 5000 micromicrofarads; resistors 84 and 85, 1 megohm each; and resistor 89, 500 ohms. Obviously, if current source 58 is other than 60 cycles, the filter network is tuned to such frequency.

The second terminal of capacitor 83 is also connected to the first end terminal of a potentiometer 91. The second end terminal of potentiometer 91 is connected to ground. The contactor of potentiometer 91 is connected to the control grid of a third triode 92. Potentiometer 91 thus provides a gain control for the amplifier. The cathode of triode 92 is connected to ground through a resistor 93 which is shunted by a capacitor 94. The anode of triode 92 is connected to a positive potential terminal 95 through a resistor 96.

The anode of triode 92 represents one output terminal of amplifier 35. This terminal is connected through a capacitor 97 to the control grids of a pair of triodes 100 and 101. The control grids of triodes 100 and 101 are connected to ground through a common resistor 102. The cathodes of triodes 100 and 101 are connected to one another and to ground through a common resistor 103. The anodes of triodes 100 and 101 are connected to the respective end terminals of a second secondary winding 104 of transformer 56. Transformer winding 104 is provided with a center tap which is connected to one end terminal of the first winding 105 of a two phase motor 36. The second terminal of winding 105 is connected to ground. A capacitor 106 is connected in parallel with motor winding 105. The second winding 107 of motor 36 is connected in series with a third secondary winding 108 of transformer 56 and a capacitor 109. The current supplied to winding 107 is thus 90° or 270° out of phase with the current supplied to winding 105.

If equal quantities of light impinge upon photocells 32 and 33, the voltages appearing across the output terminals of these cells are equal so that contacts 50 and 51 are at the same potential. There is no fluctuating signal applied to amplifier 35 under this condition. Triodes 100 and 101 are biased so as to be conductive during alternate half cycles of the voltage applied to the anodes thereof from transformer winding 104. During the first half cycle, for example, the anode of triode 100 is positive so that this triode conducts. During the second half cycle the anode of triode 101 is positive so that triode 101 conducts. This results in a current flow through motor winding 105 which comprises substantially equal pulses of a frequency of 120 cycles per second. Motor winding 107 is energized at a frequency of 60 cycles per second so that the motor remains stationary.

If a greater amount of radiation should impinge upon one of the photocells than on the other, one of the terminals 50 and 51 acquires a greater potential than the other. This results in a fluctuating input signal being applied to the control grid of triode 60. The phase of this signal depends upon which the photocells receives the greater amount of radiation. This input signal is amplified and applied to the control grids of triodes 100 and 101. If it is assumed that the output signal of the amplifier is of such phase that the control grid of triode 100 becomes positive during the half cycle that the anode thereof is positive, the current flow through triode 100 is increased. During the following half cycle the control grid of triode 101 becomes more negative than in the absence of a signal so that the conduction therethrough is decreased. In this manner the output signal which flows through motor winding 105 includes a component having a frequency of 60 cycles per second. A signal of this frequency rotates motor 36. The direction of rotation of motor 36 is determined by which of the photocells provides the greatest output signal. Motor 36 is coupled to glass block 29 to rotate the block in a direction so that the radiation beam is deflected in a direction to impinge upon the apex of prism 30 once again. Motor 36 continues to rotate until the light beam is centered and the output signal from amplifier 35 is again zero. The degree of rotation in motor 36 needed to restore this balanced condition is a function of the deviation of the refractive index of the test material from a standard reference value. This rotation is indicated by pointer 39.

While the electrical measuring circuit of this invention has been described in conjunction with a differential refractometer it should be evident that the light measuring apparatus is useful in any type of optical instrument wherein it is desired to compare two sources of radiation by means of photovoltaic cells. The circuit utilizes a minimum number of electrical components because the output terminals of the photocells are connected directly to the input of the amplifier by means of the synchronous chopper. The high impedance afforded by a photovoltaic cell provides an output voltage signal of relatively large amplitude. This results because each photocell constitutes the load impedance for the other. The voltages across such two load impedances are alternately applied to the input of the amplifier by the chopper.

While the invention has been described in conjunction with a present preferred embodiment, it should be apparent that the invention is not limited thereto.

What is claimed is:

A refractometer comprising a refractometer cell adapted to be filled with a material to be tested, a radiation source, means to direct a beam of radiation from said source through said cell so that said beam is deviated by an amount representative of the refractive index of the material in said cell, first and second photovoltaic cells positioned adjacent one another so that said beam of radiation from said refractometer cell is focused between said first and second cells when the refractive index of the material in said refractometer cell has a preselected value, means connecting the positive terminal of said first cell to the negative terminal of said second cell, means connecting the positive terminal of said second cell to the negative terminal of first cell, first and second electrical contacts spaced from one another, means connecting said contacts to respective terminals of said first cell, an element adapted to make electrical contact with said first and second contacts, a source of alternating current of a first frequency, means energized by said current source to move said element to engage said first and second contacts alternately at said first frequency, an amplifier tuned to pass signals of only said first frequency, said amplifier having a vacuum tube in the input stage thereof which has a cathode, an anode and a control grid, means connecting said control grid directly to said element, means connecting said cathode to a reference potential, means connecting said anode to a potential which is positive with respect to said reference potential, means connecting one of said contacts to said reference potential, a reversible two phase motor, means to energize the first winding of said motor from said current source, means responsive to the output signal from said amplifier to energize the second winding of said motor so that said motor rotates in a first direction when the output signal from said first cell exceeds the output signal from said second cell and said motor rotates in a second direction when the output signal from said second cell exceeds the output signal from said first cell, and means coupled to the drive shaft of said motor to deflect said beam of radiation between said first and second cells.

References Cited in the file of this patent
UNITED STATES PATENTS

| | | |
|---|---|---|
| 2,137,278 | George et al. | Nov. 22, 1938 |
| 2,404,131 | Gieseke | July 16, 1946 |
| 2,436,762 | Turin et al. | Feb. 24, 1948 |
| 2,444,442 | Herbold | July 6, 1948 |
| 2,479,566 | Haberland | Aug. 23, 1949 |
| 2,483,102 | Pierson | Sept. 27, 1949 |
| 2,527,718 | Grass | Oct. 31, 1950 |
| 2,538,494 | Barton | Jan. 16, 1951 |
| 2,583,973 | Stamm et al. | Jan. 29, 1952 |
| 2,595,034 | Wild | Apr. 29, 1952 |
| 2,612,814 | Glasser | Oct. 7, 1952 |
| 2,636,094 | Russell | Apr. 21, 1953 |
| 2,649,013 | Schnelle | Aug. 18, 1953 |
| 2,679,621 | Houck | May 25, 1954 |
| 2,686,454 | Ruska | Aug. 17, 1954 |
| 2,724,304 | Crawford | Nov. 22, 1955 |
| 2,771,149 | Miller | Nov. 20, 1956 |
| 2,789,177 | Brockway | Apr. 16, 1957 |